US008117147B1

(12) United States Patent
Rubin

(10) Patent No.: US 8,117,147 B1
(45) Date of Patent: Feb. 14, 2012

(54) TYPE 4 KASER (KNOWLEDGE AMPLIFICATION BY STRUCTURED EXPERT RANDOMIZATION) PROVIDING CASE-BASED INDUCTIVE AND ANALOGICAL REASONING

(75) Inventor: Stuart Harvey Rubin, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 548 days.

(21) Appl. No.: 12/430,224

(22) Filed: Apr. 27, 2009

(51) Int. Cl.
*G06F 17/00* (2006.01)
*G06N 5/02* (2006.01)

(52) U.S. Cl. ........................................................ 706/47

(58) Field of Classification Search .................... None
See application file for complete search history.

(56) References Cited

U.S. PATENT DOCUMENTS 7,047,226 B2   5/2006   Rubin
8,073,804 B1 *  12/2011  Rubin ............................. 706/48

OTHER PUBLICATIONS

Automatic diagnoses for properly stratified knowledge-bases; Arieli, O.; Avron, A.; Tools with Artificial Intelligence, 1996.,"Proceedings Eighth IEEE International Conference on . . . " Digital Object Identifier: 10.1109/TAI.1996.560481; Publication Year: 1996 , pp. 392-399.*

Statement of the problem of characterizing the secrecy of a common knowledge created by correlated observations and transmission over helping channels; Balakirsky, V.B.; Mobile Future, 2004 and the Symposium on Trends in Communications. SympoTIC '04. Joint IST Workshop on Digital Object Identifier: 10.1109/TIC.2004. 1409511 Publication Year:2004.*

A stratified approach to specifying, designing, and building knowledge systems; Smith, J.W.; Johnson, T.R.; IEEE Expert vol. 8 , Issue: 3; Digital Object Identifier: 10.1109/64.215218; Publication Year: 1993 , pp. 15-25.*

Reasoning about knowledge to understand distributed AI systems; Mazer, M.S.; Systems, Man and Cybernetics, IEEE "Transactions on . . . "; vol. 21 , Issue: 6 ; Digital Object Identifier: 10.1109/21. 135680 ; Publication Year: 1991 , pp. 1333-1346.*

Escardo, M., "Complexity considerations for hash tables", Jan. 12, 2006, online: "http://www.cs.bham.ac.uk/~mhe/foundations2/node92.html" taken Dec. 15, 2008.

(Continued)

*Primary Examiner* — Jeffrey A Gaffin
*Assistant Examiner* — Luis Sitiriche
(74) *Attorney, Agent, or Firm* — Kyle Eppele; J. Eric Anderson

(57) ABSTRACT

A method for reaching conclusions from stratified knowledge statements (SKSs) comprising: storing a list of SKSs in at least one memory store on a computer, wherein the list of SKSs is composed of cases, generalizations, and analogs, wherein cases are the most valid, and analogs are the least valid of the SKSs; creating a new generalization based on one of the SKSs; redefining a user-validated generalization as a new case; moving the validated new generalization to the logical head of the case list; expunging the new generalization from the list if the new generalization contradicts an existing case creating with the computer a new analog based on three of the SKSs; redefining a user-validated analog as a new case; moving the new case to the logical head of the case list; and expunging the new analog from the list if the new analog contradicts an existing case, or generalization.

20 Claims, 5 Drawing Sheets

OTHER PUBLICATIONS

Rubin, S., et al., "Learning Using an Information Fusion Approach", Proc. of the ISCA Int'l Conference on Intelligent and Adaptive Systems, Nice, 2004.

Chaitin, G.J., "Randomness and Mathematical Proof", Sci. Amer., vol. 232, No. 5, pp. 47-52, 1975.

Zadeh, L.A., "From Computing with Numbers to Computing with Words . . . ," IEEE Trans. Ckt. and Systems, vol. 46, No. 1, pp. 105-119, 1999.

Rubin, S.H., et al., "On the Role of Informed Search in Veristic Computing", Proc. 2001 IEEE Int. Conf. Syst., Man, Cybern., pp. 2301-2308, 2001.

Rubin, S.H., et al., "KASER: Knowledge Amplification by Structured Expert Randomization", IEEE Trans. Syst., Man, Cybern.: Part B, vol. 34, No. 6m Dec. 2004, pp. 2317-2329.

Rubin, S.H., "On randomization and discovery", Information Sciences, vol. 177, pp. 170-191, Jan. 2007.

Rubin, S.H., "Graphic User Interface having Menus for Display of Context and Syntax Useful in an Artificial Intelligence System" Unpublished U.S. Appl. No. 12/390,642, filed Feb. 23, 2009.

Rubin, S.H., "System and Method for Type 2 KASER (Knowledge Amplification by Structured Expert Randomization)", Unpublished U.S. Appl. No. 12/390,633, filed Feb. 23, 2009.

* cited by examiner

TYPE 4 KASER (KNOWLEDGE AMPLIFICATION BY STRUCTURED EXPERT RANDOMIZATION) PROVIDING CASE-BASED INDUCTIVE AND ANALOGICAL REASONING

FEDERALLY-SPONSORED RESEARCH AND DEVELOPMENT

This invention (Navy Case No. 099592) was developed with funds from the United States Department of the Navy. Licensing inquiries may be directed to Office of Research and Technical Applications, Space and Naval Warfare Systems Center, San Diego, Code 72120, San Diego, Calif., 92152; telephone (619)553-2778; email: T2@spawar.navy.mil.

BACKGROUND

1. Field

This disclosure relates generally to an expert system for deriving possibilities and conclusions, in which a case based decision structure is used for deriving proposed conclusions.

2. Background

First-generation expert systems are known in the database processing arts as production systems where the knowledge base and inference engine are disjointed. Second-generation expert systems are improved in the art to include a rudimentary learning capability, which may be implemented by the interpretation of grids or by user query. Third-generation expert systems are further improved to provide for rule base learning through the use of deductive and inductive processes.

Conventional analysis of information includes manually combing through vast databases and unstructured text/reports. An alternative method would be to use a database computer language such as structured query language (SQL) to perform directed mining operations. This approach is not fully general, is difficult and costly to maintain, and does not provide a capability for linking database events. Moreover, such database mining is less than optimal at rendering conclusions and probabilities.

Rendering conclusions can require association of ostensibly random events or events which appear to be random. An example of event-related activity for detection would be detection based on a previously acquired signature of the activity.

Conventional expert systems require that all knowledge be hand-tailored and manually checked for validity and consistency. In particular, conventional alternatives are either not creative, or do not reason using symbolic knowledge; i.e., computing with words.

Conventional analysis of information includes manually combing through vast databases and unstructured text/reports. For purposes of data analysis, a given concept may be broadly defined, or defined within a particular context. This may or may not have a direct correspondence to a general definition of the concept, but relates to a specific aspect of the concept. Therefore, substantial human analogical reasoning was required.

U.S. Pat. No. 7,047,226, to Stuart H. Rubin, titled "System and Method for Knowledge Amplification Employing Structured Expert Randomization" describes a Type 1 Knowledge Amplification Employing Structured Expert Randomization (KASER) engine. U.S. patent application Ser. No. 12/390, 633, filed 23 Feb. 2009 by Stuart H. Rubin, titled, "System and Method for Type 2 KASER (Knowledge Amplification by Structured Expert Randomization)" describes the general concept of a Type 2 KASER engine. The Type 1 KASER is described as allowing the user to supply declarative knowledge in the form of a semantic tree using single inheritance. In a Type 1 KASER, words and phrases are entered into the system by an operator by means of, for example, pull-down menus. In this manner, semantically identical concepts (e.g., Hello and Hi) may be entered with equivalent syntax by the operator to avoid diluting the learning efficiency of the KASER. The Type 2 KASER is described as automatically inducing this semantic tree, and having means for performing randomization and set operations on the property trees that are acquired by way of, for example, database query and user-interaction. Distinct syntax may be logically equated by the operator to yield the equivalent normalized semantics. To better appreciate this concept, consider the example of a child who may ask, "What is a bird?" to which the reply is, "It is an animal that flies." to which the question is, "What is an animal?" to which the reply is, "It is a living thing." to which the question is, "What is a living thing?" to which no reply is given, since it may be defined as an axiomatic or terminal leaf-node.

There remains in the art a clearly-felt need for an expert system architecture that may automatically expand the rule base without the concomitant data input burden associated with error correction needed to optimize expert system performance. An expert system that includes learning means for acquiring a rule system that functions as a larger virtual rule system with reduced error probability has, until now, been unavailable in the art. These unresolved problems and deficiencies are clearly felt in the art and are solved by the present subject matter in the manner described below.

SUMMARY

A Knowledge Amplification by Structured Expert Randomization (KASER) engine reaches conclusions from semantic concepts. A plurality of cases of inferences are selected, in which each case comprises at least one feature and at least one procedure or consequent. A subset of the features is selected as induced generalizations, and matched cases in the subset are identified. Representative ones of the matched cases are selected. A hierarchical order of the cases is selected, and non-monotonic rules are applied based on the cases. Context-free grammatical forms are resolved to context-free grammar (CFG). Cases whose induced generalizations contradict other induced generalizations are identified and an attempt is made to validate one or more of the contradictory cases. Generalizations contrary to the validation are deleted. A most-specific reduction of one of the case is determined and the most specific reduction is generalized. The most specific reduction in the hierarchy, in the form of a logic pattern for solving a problem is then selected.

DETAILED DESCRIPTION

It is possible to develop a System of Systems of neural networks, realized using optronic devices for massively parallel computation, to help solve this problem. It is also possible to develop new algorithms for adjusting the weights that take full advantage of massive parallelism—including the imprecision that is associated with such hardware (e.g., SLMs). Here, the use of a large scale results in a potential for increased speed, while at the same time the risk of failure is reduced. Training sets could be presented with great rapidity because digital accuracy is not required—allowing for speed-ups of from 1,000 to over one million times that of more traditional parallel digital (pure) designs.

Figure 1:
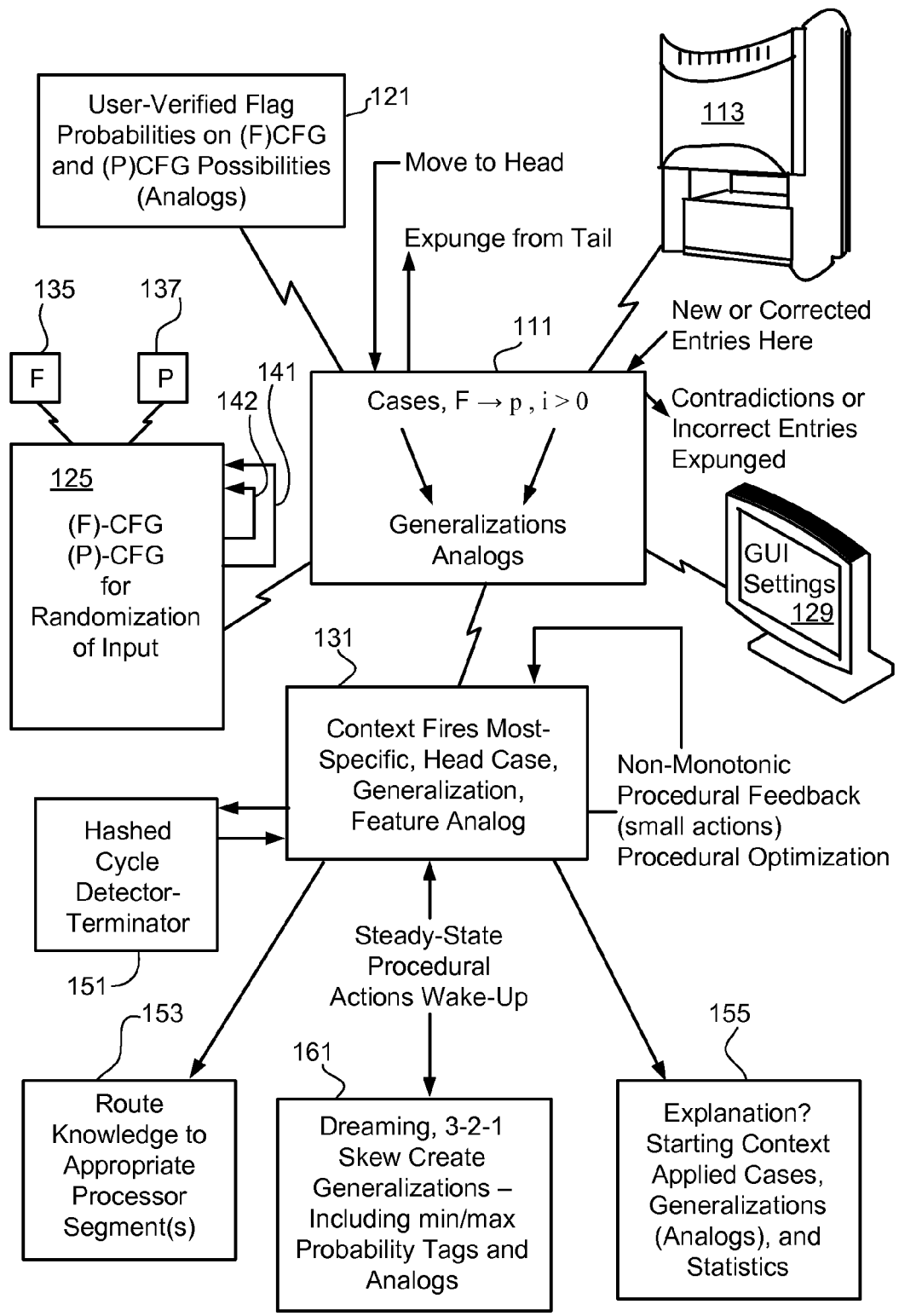
FIG. 1 is a schematic block diagram depicting a Type 4 KASER System process.

A T4K, or Case-Based KASER (CBK), is a new technology for inductive and analogical reasoning, which is depicted in FIG. 1. It offers capabilities for generalization, creative reasoning, probabilistic analysis, an explanation subsystem, massive parallelism, and distributed processing. It can provide significant advantages in decision support. The CBK sports all of the advantages of case-based reasoning (CBR), knowledge-based systems, and neural networks; none of their disadvantages; and advantages not found in their union. CBR systems facilitate case entry and learning. Knowledge-based systems provide important explanations. Neural networks work well with noisy data. CBK, unlike CBR, can generalize its cases; unlike knowledge-based systems it is far more cost-effective to build and maintain; and unlike neural networks (or evolutionary programming or genetic algorithms, et al.) it can recognize and exploit domain symmetries to greatly reduce learning time and costs. The underpinning science that makes this performance improvement possible is that of randomization—decreasing entropy. The model is described using geometric tensors (geodesics) and applies to cognitive emulation and natural selection alike. A domain model can be derived from analogies between the principal domain and other domains that are well understood. The classic example here is the direct analogy between electrical engineering and fluid mechanics.

One of the advantages of using the predicate calculus is that syntactic inference is possible and guaranteed to be valid; however, most inferences are completely useless and can be unbounded in number. Combinatoric intractability enters into resolution theorem proving too, including the derivation of programs from resolutions. These problems suggest the use of heuristic back-cut mechanisms to delimit the inferential process. This opens the door to a heuristic analogical predicate calculus, which at first glance appears to be eminently practical. For example, in addition to the universal qualifier, $\forall$, and the existential qualifier, $\exists$, one may introduce the "for most qualifier", $\Omega$, and the "for some qualifier", $\ni$, respectively. An ontology can be built up from here. By way of example, if:

$\exists z | z \epsilon Z$ for which the wff (well-formed formula) does not hold then it is possible to equivalently write:

$\Omega z \ldots$

Similarly, it is possible to write:

$\exists x \exists y, x \neq y | (x, y) \epsilon Z$ for which the wff does hold then it is possible to equivalently write, $\ni z \ldots$).

It is noted that the two qualifiers $\Omega$ and $\ni$, are not mutually exclusive, but rather are fuzzily exclusive as a function of scale. The problem is that while potentially sound, an analogical calculus, at least at the highest level, will not be practical for solving weighted mean difference (WMD) problems for the following fundamental reasons. By way of analogy, machine language is universal, but generally not cost-competitive for use by human programmers:

1. Knowledge acquisition is very difficult and time consuming.
2. Such systems can be very complex and take years to develop.
3. Despite heuristic guidance, such systems will be slow because of complex inferencing processes (process of making inferences).
4. Such systems will have difficulty in managing large volumes of information.
5. Once developed, they are very difficult to maintain.

It is noted that experts solve problems by applying their previous experience, while only amateurs attempt to solve problems by applying rules they have recently acquired. This defines a CBR paradigm. It is well known that CBR provides a reasoning paradigm that is close to the way people solve problems. CBR has the following advantages over rule-based reasoning.

1. CBR systems do not incur the knowledge acquisition bottleneck, since they need only acquire past cases. This was demonstrated by Lockheed's CLAVIER system, which was built only after they failed to build a rule-based system.
2. CBR systems do not require an explicit model, which enables scalability.
3. Implementation only requires the identification of relevant case features. Parallel and/or distributed search is readily implemented.
4. CBR systems are better suited to spiral development than are rule-based systems.
5. CBR systems do not exclusively rely upon an inference engine—making them more suitable for helpdesks and training systems.
6. CBR systems are better suited to providing analogical explanations than rule chains.
7. Maintenance is facilitated in CBR systems because they learn by acquiring cases.
8. CBR systems can incorporate multimedia (e.g., for helpdesk and/or training applications) and work well with SQL-relational/object-oriented databases.
9. CBR systems evolve with the threat and usage—far more easily than can expert systems.
10. CBR systems can be developed in about one-tenth the time of equivalent rule-based systems and can grow to be at least one hundred times larger.

CBR is about twenty years old. When neural networks were that young, they were called perceptions and did not have hidden layers—severely limiting their capability for pattern recognition. Similarly, it is postulated that the theory of randomization will allow for the construction of CBR systems of far greater utility than even the Type 1 KASER. Randomization is a good model for the brain because it is clear that humans do not just store cases, while they do make good use of an episodic memory. Rather, humans ask salient questions in an attempt that the answer will allow for the randomization of the cognitive cases—freeing space and providing for generalization, which also manifests itself in the form of analogical reasoning. The application of randomization (or KASER methodologies) to CBR offers the following attendant advantages.

1. Capability to grow ever-larger case bases using ever-less incremental memory.
2. Capability to apply case-bases to themselves to assist in feature specification.

3. Randomization structures relationships between cases and parts of different cases. Randomization knowledge itself may be stored as cases—allowing for self-reference.
4. Capability for automatic generalization and adaptation of cases along with automatic constraint checking
5. Capability for rapid data entry through the use of granules.
6. Ranking of cases by possibility (e.g., an entered case might be ranked 0, while one derived through the use of a single analogy might be ranked 1, and so on.)
7. Capability for the rapid automatic induction of analogous knowledge—including attendant similarity explanations.
8. Domain-independent representation (e.g., using relational databases), storage, randomization, and indexing mechanisms (e.g., using ID3 search trees) so as to maintain feasibility with scale (e.g., on the order of one million cases).
9. Capability to update (including case features) or expunge cases in the base.
10. Capability to integrate with other reasoning paradigms—especially neural networks. CBR, when combined with relevant features, distributed processing, and most importantly randomization technologies, offers a capability for the rapid interpretation of audio, visual, radar, sonar, and/or smart sensors like no other technology.

Different reasoning methods (e.g., rules, analogical reasoning, deep causal reasoning models, evolutionary programming, neural networks, support vector machines, et al.) may be combined with CBR, just as CBR itself allows for the automatic adaptation of cases when combined with randomization methodologies. By way of example, tracking and fusion pertaining to Weapons of Mass Destruction (WMDs) becomes realizable, maintainable, and most-importantly, creative, when the aforementioned paradigm is pursued. Furthermore, in keeping with the above arguments, no superior technological approach can deliver the scalable results sought by the ISR community for a cost-effective price, or at least so it has been argued.

Parallel and Distributed Processing:

The two processing paradigms are SIMD and MIMD. The SIMD approach deploys one copy of the code on each system, where the problem domain is partitioned and each processor is given responsibility for one partition of the problem space. In the MIMD approach, the same executable is run on multiple nodes. Here, one copy of the executable code deploys across multiple systems that are networked and/or utilize multiple CPUs within the same system. There is less probability of error using a MIMD architecture because it in not necessary to handle MUTEX inherent serial code. It is also easier to convert serial code to MIMD code and to extend the number of nodes in the future.

Operation

FIG. 1 is a schematic block diagram depicting an example Type 4 KASER System process. An abstraction module 111 applies a set of matched cases, generalizations, or analogs ("matched cases/generalizations/analog inferences"). The matched cases/generalizations/analog inferences are maintained in a hierarchy. Abstraction module 111 functions as an inference engine by using the matched cases/generalizations/ analog inferences to provide, as its output inferences based on the matched cases/generalizations/analog inferences. Abstraction module 111 establishes a hierarchical order of the matched cases/generalizations/analog inferences, and in the case of matched cases/generalizations/analog inferences which are determined to have a high validity moves that matched cases/generalizations/analog inference to the head of the hierarchy. In the case of the matched cases/generalizations/analog inference being deemed invalid or having a low validity and exceeding a predetermined capacity of the hierarchy, the matched cases/generalizations/analog inference is expunged. Abstraction module 111 may function alone or use external computer 113. External computer 113 may be any computer capable of resolving the matched cases/generalizations/analog inferences in the hierarchy. In the example configuration a SiCortex 5832 supercomputer is used, which is capable of processing substantial amounts of data quickly.

Also shown are user-verified flag possibilities 121, context-free grammar (CFG) module 125, GUI settings 129 and context firing module 131, which are all linked to abstraction module 111. In addition, user-verified flag possibilities 121, CFG module 125, GUI settings 129 and context firing module 131 provide in the case of user input, user interfaces.

User-verified flag possibilities 121, which are communicated through a user interface, and allow the user to flag probabilities on feature context-free grammar 135, or distinct procedural context-free grammar 137 possibilities or analogs. CFG module 125 provides scrollable mnemonic pop-up lists. The feature context-free grammar 135 is referred to as (F) CFG and the distinct procedural context-free grammar 137 is referred to as (P) CFG. CFG module 125 is used for randomization of input, and provides a "move to head" function, indicated by arrow 141, and iteratively expunges unreferenced productions ("forgets"), indicated by arrow 142.

Context firing module 131 fires the most-specific, head case, generalization or feature analog, and uses a non-monotonic procedural feedback to effect small actions and to achieve procedural optimization. Also depicted are hashed cycle detector and terminator 151, routing module 153, explanation module 155 and dreaming module 161. Routing module 153 routes knowledge to appropriate processor segments. Explanation module provides explanations of the matched cases/generalizations/analog inferences fired by context firing module 131, which provide translations of the logic for user and machine use.

Dreaming module 161 uses a 3-2-1 skew algorithm to create generalizations. The generalizations include minimum and maximum probability tags and analogs. Dreaming module 161 operates during system idle time, and so is responsive to "wake-up" signals when context firing module 131 is used for other functions.

The algorithms provide distinct methodologies for the emulation of human creative thought; that is, they are machines capable of creating novel and patentable devices that one with common knowledge in the domain of discourse might not. The techniques are capable of similar output based on the algorithms (i.e., in its own right) and by employing domain-specific knowledge.

The use of domain-specific knowledge avoids the need to to evolve or avoid knowledge that has served practitioners in any given field of study. Instead, the Type 4 KASER may be supplied with rule-like knowledge by a domain expert. It then not only is capable of applying that knowledge, but can also use it to infer new knowledge that is available through deduction. That knowledge, along with previously validated knowledge, can itself be applied to create new knowledge, devices, formulas, etc.

The knowledge base can be scaled up because the Type 4 KASER is not limited by latent knowledge, and therefore is not limited to tractable alternatives. Thus, for example, if a particular knowledge base describes polygons for use in antennas, it is possible to induce a perfectly circular antenna based on knowledge of circles and electromagnetic induction. The Type 4 KASER (Case-Based KASER, CBK, or T4K) Algorithm The algorithm for the Type 4 KASER, also described as Case-Based KASER, CBK, or T4K, is as follows:

1. A case is defined by a row comprising of one or more features {in set} and one or more procedures in sequence. Procedures may instantiate, add to, or delete from the set of case features as well as direct domain-specific feature formation in an advanced architecture. Here, feature schemata are randomly instantiated, where the best features survive and the rest are iteratively expunged. A case base is defined by one or more rows and may incorporate at least one million cases, which may be stored in a relational database and brought into memory. The independent feature(s) are specified at time zero and the sequence of dependent procedures are produced at time one, two, etc. It is convenient to group features lexicographically and procedures sequentially from left to right, $F_t \rightarrow p_{t+i}$, $i>0$. Features and procedures may comprise computer code. Procedures may also pose questions for the user, or query a domain-specific subsystem so as to elicit additional context. They may also display multi-media content; e.g., for applications in education and training 2. A difference between a case and a generalization is that unlike cases, generalizations may only be machine generated. Generalizations are defined by a proper subset of the features of the cases/generalizations/analogs from which they are induced. It is noted that generalizations/analogs may not find associated cases in the base and vice versa because of selective purging over time.

3. Structured Query Language (SQL) may be used in conjunction with a relational database to retrieve matched cases/generalizations/analogs. Alternatively, such search should be accomplished using fine-grained parallel processors operating in parallel, where a domain-specific segment of the case/generalization/analog base resides on each processor.

4. A problem-solving methodology needs to be scalable to insure practicality. Improving scalability will increase the domain of problems that can be addressed. The Linux-based SiCortex 5832, which measures 56"×56"×72", has up to 7.776 Tbytes of memory, 5,832 733-MHz, 1.4-Gflops processors, yielding a total maximum performance of 8.164 Tflops—the entire supercomputer uses only 14 kilowatts. The entire memory of the SiCortex 5832 can be accessed by any single core, i.e., in the manner of a RAM disk.

5. To the extent practical, cases, and thus generalizations and analogs, should define small actions to facilitate reuse. Creative procedural sequences are defined by the automatic concatenation of such small actions. For example, a case/generalization/analog should only predict temperature—not temperature and precipitation. Then, corrector cases/generalizations/analogs can be acquired for non-monotonic reasoning. For example, one case/generalization/analog might predict sub-zero temperatures, while another one might predict rain. A subsequent case/generalization/analog would fuse the outputs of the two prior ones (i.e. temperature and precipitation), which serve here to modify the context, to predict, for example, snow. Here, the output modifies the context, which leads to further output, which may be used when acyclic and in the steady state; i.e., brain-like. A cycle is detected by a repetition in a contextual state, which leads to expunging the last case/generalization/analog to be applied that produced the duplicate state and continuing to use the resultant context for covering and firing as before. This match and fire process stops when the contextual state is not changed by it. Procedural actions may or may not modify the context and may or may not produce output—so long as they are not NIL. A simple hash mechanism can be used to efficiently test if a contextual state is a repetition. This technique lends itself to reuse and is more general than case modification. It can serve to optimize procedural sequences in lieu of the erroneous procedure-based analogical reasoning, which is defined below. It is noted that while the rule sequence can change as a result of rule firings and this can result in the same context leading to a distinct result, the net gain here does not come near justifying the increased space-time cost of so doing. Here, global optimality is implied by the allowance for local sub-optimality.

6. The reserved "+" and "−" signs are used to automatically modify the context in conjunction with a fired non-monotonic case/generalization/analog, using the exact word(s) or phrase(s) that follow (corrected for spelling and possibly grammar), hashed to unique integers to save space, and delimited by commas. Predicates prefixed by a "+" will augment the context. Similarly, such predicates prefixed by a "−" will erase from the context the syntactically matching predicate, if present. Only such prefaced consequents may automatically modify the context on the next iteration of the inference engine. This process of insertion and erasure effects truth maintenance operations; i.e., iteratively retracting or replacing assertions and conclusions that are no longer valid as a result of case/generalization/analog actions. The authoring of syntactically proper non-monotonic rules requires that the user be given visual access to the most-recent context. Of course, consequent predicates may also pose questions—the answer to which will modify the context via user interaction, or in theory procedural interaction. A single consequent may specify an arbitrary number of "+" and "−" actions, which will be executed in sequential order from left to right. The context may not contain duplicate integers, since it is a set.

For example, a contextual set placed in numerical order using Quicksort, to facilitate search operations, which utilizes bisection search, might be, {1, 34, 35, 41, 897}. Next, a fired case/generalization/analog action might be, −41, which will change the context to, {1, 34, 35, 897}, where unique integers are hashed to an ascribed semantics and vice versa. It is permissible to attempt to erase an integer not present. This will simply result in an identity operation. The use of the "+" sign is similar.

7. A simple optimization is also performed as follows prior to saving a new non-monotonic rule. Scanning from left to right, advance the pointer by one to the right until the end is reached. It is noted that in the optimization procedure that appears next, the word followed allows for non-contiguous following:

a. If +# is not followed by −#, then keep the +# and advance the pointer.

b. If +# is followed by −#, then delete the +# and advance the pointer.

c. If +# is followed by +#, then delete the left +# and advance the pointer.

d. If −# is not followed by +#, then keep the −# and advance the pointer.

e. If −# is followed by +#, then delete the −# and advance the pointer.

f. If −# is followed by −#, then delete the left −# and advance the pointer.

For example, let the context be {2, 3, 5}. Let, the user specify the initial non-monotonic command sequence: +3, +3, −3, +3, +3, −3, −3. The result of applying this sequence to the context is the set, {2, 5}. Applying the optimization step (b) above to the initial non-monotonic command sequence yields, +3, −3, +3, +3, −3, −3. Next, applying (b) again yields, −3, +3, +3, −3, −3. Next, applying (e) yields, +3, +3, −3, −3. Next, applying (c) yields, +3, −3, −3. Next, applying (b) yields, −3, −3. Finally, applying (f) yields, −3. This then is the desired optimization. It immediately replaces the initial non-monotonic command sequence in the saved case/generalization/analog.

8. Two or more words or phrases may share the same semantics. One would not necessarily want to reacquire those semantics, but rather equate them in context. The greatest need here occurs when processing non-monotonic rule actions. For example, the context may currently hold, e.g., from a previous prediction, that there are "subzero temperatures" outside among related predicates. If a fired case/generalization/analog were to effectively predict, "+rain" say, then one would like to automatically effect, "− rain, +snow". Thus, one may write, "subzero temperatures, +rain"→"subzero temperatures, snow". This transformation is at once recognized as a corrector case/generalization/analog as was previously discussed.

Corrector cases/generalizations/analogs are universal for effecting the equation of context-sensitive semantics. As this example demonstrates, such complex equations are not accessible using menus for context-free semantic association; e.g., "hello" and "hi" may be ascribed the same unique integer semantics; although, this may not hold in certain contexts. Furthermore, acquired corrector rules can trigger other corrector rules once fired, which collectively define a Type 0 grammar comprised of non-monotonic cases/generalizations/analogs.

9. Features may be ascribed a probability, e.g., 0.75 "cloudy". Procedures may also be ascribed a probability; e.g., 1.0 ("take_cell-phone" and (0.6 "take_raincoat" or 0.4 "take coat")). In this example, the user must ascribe a probability of at least 0.75 that it is cloudy for cloudy to be included in the context as a feature. Of course, the feature, 1.0 "mostly cloudy" would be another equivalent way to represent this information; i.e., through the actions of non-monotonic rules. Equivalence transformations will be effected by way of computational analogy. In this example, one always takes ones cell-phone and usually also takes a raincoat or less frequently a coat in lieu (the ascribed disjunctive probabilities must sum to unity for each disjunctive set). The system will automatically normalize supplied disjunctive probabilities so as to sum to unity. For example, a supplied (0.75 "take raincoat" or 0.50 "take coat") becomes (0.6 "take raincoat" or 0.4 "take coat") after normalization; i.e., multiplying the supplied disjunctive probabilities by 1 divided by their sum. The applicable procedures are chosen probabilistically using a uniform random number generator. All probabilities are 1.0 (i.e., 100 percent) by default. They are never propagated up through grammatical productions and may only be set by the user. Alternatively they may be set by a domain-specific subsystem.

10. Features are input using randomized, context-free grammars; i.e., granularization. For example, consider the following generalization and case in the base.
   a. Case1: barometer_falling and cloudy and west_wind→precipitation
   b. Case2: freezing and barometer_falling and cloudy and west_wind→snow
   c. Then, the following syntactic randomization is formed:
   d. Case1: BAD_WEATHER→precipitation
   e. Case2: freezing and BAD_WEATHER→snow
   f. Case3 can be ignored: freezing and precipitation→snow, for the moment, which exemplifies non-monotonic reasoning, for purposes of illustration.
   g. Here, BAD_WEATHER→barometer_falling and cloudy and west_wind Then, if the user were to enter say, "cloudy", the system might ask the user if BAD_WEATHER is the situation. The user could reply, yes, no, or "do not know". If the latter, the system could elaborate by asking the user if barometer_falling and west_wind and so on in accordance with depth-first recursion in a context-free grammar (CFG). This hierarchical specification of feature sets comprises a feature, which augments the existing set. Sequences of procedures may be similarly randomized using a distinct CFG. Columns that are no longer used by cases and generalizations are freed. This allows for the evolution of ever-better feature sets and procedural sequences. Algorithms for realizing such iterative incremental randomization follow.

11. The specification of features and procedures is based on the concept of randomization as realized by CFGs. The so-called non-terminals here are conceptual mnemonics, specified by the user, for use in the feature (F) CFG, or the distinct procedural (P) CFG, as appropriate. The defined mnemonics must be deterministic and may not be right recursive. It is noted that automated grammatical inference would need to be heuristic-based for CFGs or higher. However, non-terminals are not to be automatically extracted because they must be in perfect alignment with human conceptualization. That is, feature subsets or procedural subsequences might otherwise be extracted that are not readily conceptualized—if at all. This is also a scalability concern. Mnemonics, akin to cases/generalizations/analogs, may be ordered by moving them to the logical head of a separate containing list (in the local processor) upon reference to save on mean search time in keeping with Denning's principle of locality of reference.

Whenever an analog/generalization/case is expunged from the logical tail, its constituent feature and procedural mnemonics, if any, may be sought to see if they are still present in the case/generalization/analog base. Any mnemonics that are no longer present here may be checked to see if they are employed in the definition of any other mnemonics in its defining CFG. If not, then the mnemonic(s) may be expunged. This process may be batched to run during dream mode. It may also be made to run more efficiently through the use of reference counts, where the counts refer to base as well as grammatical references.

Alternatively, i.e., trading conceptual retention space for speed, the size of the mnemonic bases may be left unchecked; e.g., as would be the case for Webster's Dictionary, for example, since all dictionary editions are relatively limited in size when compared with that say of all of the English books ever written—including all those that may yet be written. The mnemonic bases may also best be left unchecked in size because CFGs tend to be self-limiting in their pragmatic growth when compared with the simpler linear lists. The process of losing mnemonics is termed, "forgetting". Less memory implies more forgetting. Once specified, mnemonic definitions may be overwritten, but here the conceptual meaning of a mnemonic must remain unchanged to maintain proper semantics for any embedded usage.

12. Feature sets are saved in lexicographic order; whereas, procedural sequences must remain immutable. Whenever the user is in the process of entering a feature set (in any order), or procedural sequence (from left to right), scrollable pop-up lists show the possible conceptual mnemonics, if any, which randomize it. The order of covering is irrelevant for feature sets; whereas, it must be strictly left to right for procedural sequences. Optimized non-monotonic sequences are to be included in this randomization. It follows from the fact that neither the F nor P CFGs may be completely randomized that the pop-up lists should be presented in non-increasing percentage of covered mnemonic definitions; i.e., number of terms covered divided by the total number of terms in the definition. This will allow the user to associate first with almost completed mnemonic definitions. Left-clicking on a mnemonic will display its defining, top level set, or sequence, as appropriate, along with the query, "Do you want to specify this mnemonic; i.e., feature or procedure?" This query is automatically presented whenever a single mnemonic would otherwise comprise the pop-up list. If the user elects to specify the mnemonic, this saves the labor of specifying the remaining elements in the set or sequence, as appropriate. Otherwise, "long-hand" entry continues. Such grammatical reduction is recursively made so that each conceptual mnemonic is tagged with a set or sequence, as appropriate, at the highest level, or equivalently in most terse form. Right-clicking on a mnemonic will simply display its defining, top level set, or sequence, as appropriate, which comprises two or more elements for use as a conceptual mnemonic dictionary.

For example, AUTOMOBILE→{body, ENGINE, ... }; ENGINE→{pistons, cylinders, spark plugs, ... } The user is offered the opportunity to supply a mnemonic for a previously unnamed set or sequence, as appropriate. That is how the set-mnemonics, "AUTOMOBILE" and "ENGINE" get defined in the previous example. The chosen mnemonic must be unique for the feature and procedural CFGs, or errors will be introduced upon non-terminal expansion; e.g., in case of tail deletion, et al. A search over all other feature set definitions and procedural sequence definitions, in the single symbol table is performed whenever a new mnemonic is defined. It is noted that non-monotonic predicates can serve as antecedents and consequents when used as flags. The new mnemonic replaces its definition wherever found in order from left to right. Such reductions do not enable further reductions because the new mnemonic is otherwise unknown by the grammars. This then is context-free randomization. It provides for the ever-simpler specification of ever-more complex feature sets or procedural sequences. These randomizations need be processor-local to avoid contention on the bus.

13. If a single case/generalization/analog is fired in sequence and the user deems the result to be correct, then the rule is moved to the logical head of the now proper linked list and is marked as validated. Conversely, in the same situation, if the user deems the result to be incorrect, then the rule is expunged.

If a sequence of cases/generalizations/analogs is fired (in any combination) and the user deems the result to be correct, then the rules are moved to the logical head of their current linked list so as to preserve their original relative ordering; i.e., stable. Conversely, in the same situation, if the user deems the result to be incorrect, then the rules are moved to the logical tail of their current linked list—again in stable relative order.

It is noted that the user has the opportunity to correct any incorrect response, which serves to prevent iterative repetition of an incorrect result. Movement to the tail will alter the agenda of "first most-specific-match". Then too, tail deletion will at some point expunge the improper rule(s)—those that find themselves in numerous incorrect sequences.

14. Cases and validated generalizations or analogs are saved in one linked list. A second linked list contains only non-validated generalizations, which may not contain any non-validated analogs in their derivational path. A third and final linked list contains any remainder.

First to be matched are the most-specific validated cases, generalizations, and analogs taken as one linked list. If a covering cannot be had here, then next to be matched are the most-specific non-validated strict generalizations. Last to be matched are the most-specific rules containing one or more non-validated analogs in their derivation. The use of three distinct linked lists here serves to maximize the likelihood that a best covering will be had.

15. Whenever a most-specific case/generalization/analog is covered (fired), it is logically moved to the head of the case/generalization/analog base, which reflects its higher utility. Cases/generalizations/analogs that logically fall to the tail may be expunged to save space (and time), or optionally moved to a secondary storage medium in a memory-bound architecture. This models procedural memory loss in humans. There is an order for expunging from the logical tail up as follows. One linked list must be empty before expunging from the next. This insures that memory will not be overrun with generalizations/analogs that expunge validated knowledge. First to be expunged are non-validated analogs. Next to be expunged are non-validated generalizations. Last to be expunged are the validated analogs, generalizations, and cases themselves taken as one linked list. It is noted that if the processor(s) are too fast, or the core memory(s) are insufficient, then at least analogs may be lost before exercise. The solution here is to insure that the addressable RAM is maximized.

16. The reason for generalizing cases, where possible, is to increase their reusability by eliminating extraneous features. The process of generalizing cases, probabilities, and performing feature-based analogical reasoning whenever the system would otherwise be idle is termed, dreaming. A non-limiting example of a condition in which the system would otherwise be idle would be until the system is awakened by an interrupt, in which case the system may engage in dreaming. Generalizations are made by uniformly and randomly selecting from [1, |features-1|] feature(s) for elimination, where there are at least two features initially (local to a domain-specific processor) and at least one feature remaining This insures the introduction of more general knowledge, i.e., when compared with generalizing one randomly chosen feature at a time, at an earlier point, when the utility is maximized, as a result of dreaming. Cases/generalizations/analogs are randomly and iteratively selected by chance for such attempted generalization. The distribution here is skewed using the 3-2-1 skew to favor the logical head of the list in keeping with Denning's principle of locality of reference. Cases/generalizations/analogs may only move to the logical head of their resident processor, where each processor independently realizes this skew for its local memory. Notice that every case/generalization/analog at the logical head of its local processor will receive immediate attention in parallel.

17. Cases/generalizations/analogs are non-redundantly acquired at the logical head of the case/generalization/analog base; i.e., matched redundant ones are moved to the head. A contradiction, or non-determinism, is said to exist if the same set of features is paired with a distinct sequence of procedures. The acquisition of a new case will cause any case/generalization/analog in contradiction with it (there can be at most one) to be expunged. The acquisition of a generalization (not including a non-validated analog in its derivational path) will cause any non-validated generalization or non-validated analog (cases are user-validated by definition) in contradiction with it (there can be at most one) to be expunged. Here, if the generalization includes at least one non-validated analog in its derivational path, then its acquisition will cause any non-validated analog or non-validated generalization containing a non-validated analog in its derivational path, which is in contradiction with it to be expunged. A non-validated generalization may not be acquired if in contradiction with a case, user-validated generalization, or user-validated analog. The most-specific (closest to the logical head in the event of a tie) (first responder in the case of multiple processors in the event of a second-level tie) case/generalization/analog covered by the context is the one selected for firing (defined across all processors for a best match, or alternatively across some subset thereof to allow for concurrent actions).

18. A most-specific covering is defined by a maximally reduced, i.e., randomized, context and a maximally reduced set of case/generalization/analog antecedents. The process of reduction requires that a most-specific (longest) reduction be iteratively made until no more reductions are possible. Then, a most-specific covering proceeds using the sorted context and stored sorted feature sets at this topmost level. Features are never grammatically expanded in an attempt to find a match as not only does optimality potentially require too much space-time; but for example, a context that finds no match for BAD_WEATHER and is expanded, might find a match for west_wind, but the action sequence produced; e.g., negative ions may be yielded, may have little if anything to do with the notable consequences of bad weather; e.g., seek shelter. Similarly, Resolution Theorem Provers can fail if the back-cut mechanism fails to check the combinatoric explosion in the number of predicates to be resolved; e.g., the Japanese Fifth Generation project.

19. Probability tags may also be generalized. For example,
    a. Case/Generalization/Analog1: 1.0 barometer_falling and 0.75 cloudy→0.90 precipitation
    b. Case/Generalization/Analog2: 1.0 freezing and 0.60 barometer_falling and 0.80 cloudy→0.85 snow
    where the features of Case/Generalization/Analog i ⊂ Case/Generalization/Analog j, i≠j.

It is noted that if the two sets of features were equal, then the pair of productions would be redundant or contradictory, i.e., depending on the equality of the pair of procedural sequences, which again is enjoined. Each consequent, for all rules, i.e., to enforce maximal reusability, may be ascribed exactly one probability. For example, one may write 0.95 (cloudy and (0.40 rain or 0.60 snow)); but, never say 0.95 cloudy, 0.50 (0.40 rain or 0.60 snow).

For example, one needs to be at least 75 percent sure it is cloudy before Case/Generalization/Analog1 can predict a 90 percent chance (or strength) of precipitation. Here, the two generalizations are:
    c. G1: 0.60 barometer_falling and 0.75 cloudy→0.85 precipitation
    d. G2: 1.0 freezing and 1.0 barometer_falling and 0.80 cloudy→0.90 snow G1 is a min-generalization (think 0.0 freezing in Case/Generalization/Analog1) and has the minimum probability of the two feature sets on the left and the associated action sequence on the right. G2 is a max-generalization and has the maximum probability of the two feature sets on the left and the associated action sequence on the right. The procedural probabilities (strengths) are either minimized or maximized, respectively. A min-generalization and a max-generalization may be computed in parallel and saved. It is noted that G1 and G2 can never be redundant or contradictory. G1 replaces Case/Generalization/Analog1 and G2 replaces Case/Generalization/Analog2. It follows that since the cases/generalizations/analogs are not redundant or contradictory, their probabilistic generalizations will not be either. In practice, the cases/generalizations/analogs iteratively selected as candidates for probabilistic generalization comprise two distinct rows successively selected at time t and time t+1 by the 3-2-1 skew (local to each processor) such that the set of ones features is a proper subset of the set of the others features. Cases, generalizations, and analogs are only expunged to reclaim space when they fall into disuse as described above.

20. A case/generalization/analog can be randomized by a maximum of $2^n$ candidate generalizations. This is potentially an intractable number over the entire base. In view of this potential problem, select a case, generalization, or analog for randomization with dynamic probability of selection skewed in favor of those cases/generalizations/analogs, which are most-frequently fired. The closer a case/generalization/analog is to the top of the global linked list, the greater the likelihood of its selection. It is noted that the "type of rule" link is distinct from the "global position link". A good scheme, i.e., the 3-2-1 skew, for achieving this with an application domain base of c cases/generalizations/analogs is to assign the head case/generalization/analog a probability of being selected of $$\frac{2c}{c(c+1)}.$$

The case/generalization/analog just below the head case/generalization/analog has a probability of being selected of $$\frac{2(c-1)}{c(c+1)}.$$

Finally, the tail case/generalization/analog of the base has a probability of being selected of $$\frac{2}{c(c+1)}.$$

A highly efficient algorithm for realizing the 3-2-1 skew is given below, and may be used for dreaming. This algorithm has the added advantage of favoring just the relative head of the list during very short naps, which is proportionately most in need of generalization time. In this example, the distribution is skewed in favor of more recently fired cases/generalizations/analogs:

i=1;
Repeat
    Select a case/generalization/analog for generalization using a uniform random number generator (e.g., Mersenne Twister) with integers in [1, i]; Attempt to generalize the case/generalization/analog as previously described; If i<current number of rows, i.e., entries, in the processor base, i←i+1
Until
    Wake-Up;

21. If the user deems a case/generalization/analog to produce an incorrect procedural sequence, the incorrect case/generalization/analog is immediately expunged and replaced at the logical head by the procedurally corrected case/generalization/analog when and if known. The discovery of an incorrect procedural sequence results in the contextual matching process being rerun so that the user (intelligent subsystem) can update/expunge the offending rule(s), which may or may not be the last one to fire; e.g., due to non-monotonic actions. The user is to replace an incorrect case/generalization/analog with a correct case and not attempt manual generalization other than the exclusion of irrelevant features. New cases may incorporate alternative features. In the event that an incorrect procedural sequence is produced, the user may elect to search for another match, when available, or not as a matter of preference.

22. A notable feature of the Case-Based KASER, CBK, or T4K is its capability for analogical reasoning. Cases or generalizations allow for feature-based analogical reasoning:

$$Y \rightarrow X; Z \rightarrow X \quad (1)$$

where the non-terminals are defined as sets or sequences, as appropriate, using CFGs for the expansion here. This yields the inductive transform, $Y \leftarrow \rightarrow Z$, where X is a common procedural sequence.

It is noted that the following procedure-based analogical reasoning is not allowed:

$$Y \rightarrow X; \text{ and } Y \rightarrow Z \quad (2)$$

The reason (2) is not accepted is because the underlying logic is inherently error-prone and again because contradiction, or non-determinism, is never permitted. Feature sets allow for context-free substitution (1); whereas, procedural sequences require at least context-sensitive substitution (2) to preserve relative validity, by definition. As a consequence, only feature-based analogical reasoning (1) is permitted. Again, a procedure-based analogical mechanics is attained through the use of non-monotonic reasoning, which is eminently practical—unlike the theoretical model of an acquired context-sensitive (or more generally, Type 0) corrector grammar (w-grammar).

23. Analogous case/generalization/analog feature sets are created when in dream mode and saved along with their associated procedural sequences at the logical head of the globally linked list (of the local processor) when non-redundant and not in contradiction (there can be at most one at any given time) with a case or any generalization having an error possibility of zero; i.e., not induced by analogy, or if user-validated—including analogs. The acquisition of an analog will cause any non-validated analog (in the local processor) having an error possibility greater than zero in contradiction with it (there can be at most one) to be expunged. Non-validated analogs may not cause any generalization to be expunged because generalizations are more likely to be valid as a class. Again, a generalized analog is defined to be an analog; i.e., the weakest link until validated. Whenever the feature sets, Fi, Fj|i≠j, associated with the two distinct rows successively selected at time t and time t+1 by the 3-2-1 skew (local to each processor) subsequent to min-generalization and max-generalization, where Fi ⊂ Fj, an analogical feature transformation (1) is possible. Fi' (also paired with Pi) is sought to replace the proper subset Fi in Fj, by searching from the head link down to the one just above Fi for the first Pi (excluding any row holding Fi or Fj), if any, using schema (1). If found, Fj←Fj–Fi+Fi'. The case/generalization/analog holding Fi' is at or nearer to the head of the linked list, which implies that it was more recently used or created and thus more likely to be used in the near future (Denning's principle of locality of reference). This link ordering is dynamic and varies with exercise. The associated procedural sequence, Pj, is not changed.

To illustrate the analog creation method disclosed above, consider the following simple example related to creating analogs for predicting rain. This example starts with the Type 4 KASER choosing two case/generalization/analogs: Fi→Pi and Fj→Pj by the 3-2-1 skew method discussed above. Each case/generalization/analog comprises a feature set F on the left-hand side and a procedural sequence P on the right-hand side. In this example, let Fi→Pi equal {clouds, drop in atmospheric pressure}→(Rain), and let Fj→Pj equal {clouds, high humidity, drop in atmospheric pressure}→(Rain). As can be seen, Fi is a subset of Fj and i and j are not equal, which satisfies the requirements for analogical feature transformation. Continuing with the example, the Type 4 KASER then searches the list of case/generalization/analogs, starting at the logical head, to find another case/generalization/analog with the same procedural sequence (i.e. Rain). In this example, assume that the third case/generalization/analog found by the Type 4 KASER has a feature set Fi' equal to {thunder, lightning, wind picking up}. A new analog is created by replacing the feature subset Fi within Fj with Fi' to produce a new feature set. In other words, the features of clouds and drop in atmospheric pressure in Fj are replaced by thunder, lightning, and wind picking up to produce the new analog: {high humidity, thunder, lightning, wind picking up}→(Rain). This new analog is then compared to the other case/generalization/analogs in the list and expunged if any contradictions are found.

24. Dream mode may be further algorithmically defined as follows.
   a. L1: From the set of all rows in a processor, i.e., including cases, generalizations, and analogs, randomly select (using the 3-2-1 skew) one row having features, F.
   b. If |F|>1, then uniformly randomly select from one up to one less than |F| features to eliminate in an attempt to create a generalization. The actual number to eliminate within these bounds is chosen uniformly randomly too. The generalization is used in the following steps. If a successful generalization is made, then go to L1. A generalization is said to be successful if it does not contradict a "row more likely to be valid than it" and is not redundant.
   c. When features are randomly chosen for elimination, remove them from consideration before the next feature is randomly eliminated, if any, so that no feature is ever attempted to be eliminated more than once. Thus, if you start with ten features, you have a one in ten chance of eliminating the initial feature, a one in nine chance of eliminating a feature from the nine remaining, and so on until at least one feature remains.
   d. Select the two most-recently chosen (generalized) rows. It is noted that rows are moved to the logical head of the global linked list after being selected/created. Thus, so long as at least two rows are in the base, this is always possible.
   e. Attempt to do a min-max generalization of the last pair of selected rows. If this fails because the features of one are not a proper subset of the features of the other (there can be at most one proper subset for a given pairing), then go to L1.
   f. Traverse the list of rows from the logical head down until a row is encountered (excluding any row holding the subset or superset of features) having the same exact procedural sequence as the row whose features are a subset of the features in the selected pair, or this row holding the subset of features is reached; i.e., failure. If failure, then go to L1.
   g. Remove all features in the intersection of the original row pairing from the row holding the superset of features. By definition of a proper subset, at least one feature must remain. Take the union of whatever features remain with all of the features from the logically topmost row just found and so far not used in these operations. The resulting set of features is paired with the procedural sequence associated with the row of the pairing that was holding the superset of features. The resulting analog rule is saved at the logical head of the global linked list if and only if it does not contradict a "row more likely to be valid than it" and is not redundant.

h. The user interrupt is only processed at the end of each cycle—not necessarily when entered, though it may be entered at any time. If an interrupt, exit dream mode, else go to L1.

25. The firing of cases/generalizations/analogs by a context may be attended by an explanation, if the user types "explain", "why", or simply, "?". In addition to the user-validation status and any probability tags, an error possibility count is provided, which measures the cumulative number of feature transformations (1) employed to induce it; e.g., an error possibility of zero for a case or generalization not induced by analogy, or if user-validated. It is noted that non-monotonic procedural consequents are valid, since specified by the user though such rules too are subject feature transformations (1) and thus possibility errors. Explanations enumerate the starting context and the sequence of applied case(s), and/or generalization(s), and/or analog(s), if any, along with their user-validation status, probability tags, and error possibilities.

26. The case/generalization/analog base may be segmented to allow for greater parallel and distributed intelligence. Such segmentation is typically done by domain and operates in accordance with Minsky's Society of Mind. That is, procedural action(s) issued by any processor(s) can be fused by way of contextual modification through their action(s), which is iteratively fed back to the parallel/distributed processors as described above for non-monotonic reasoning. Incoming non-redundant cases are routed to all segments. Procedural sequences are separately reduced by each processor's local P-CFG. Generalizations and analogs reside in the same processor segment as their parent(s). The allowance for redundancy of cases among processors supports cross-domain analogies; e.g., simulated annealing, which is a more general form of creativity.

Output and Transformation

The output is useful either as an end result, such as a generation of one or more list items. A non-limiting example is given above as tracking and fusion pertaining to Weapons of Mass Destruction. Similar outputs (also non-limiting) can be determinations of optimum map routings, adjustment of map routings which had previously been made with Dijkstra's algorithm, and selection of pharmaceutical compounds for testing. The output can also be provided as a display of the generalizations or rules. The generalizations and rules can also be used to perform further processing.

Logical Transformations Example—Refrigeration Design

The following is given as a non-limiting example of a series of logical transformations which are performed according to the subject technique. The transformations demonstrate the utility of randomization in learning to abstract design principles from granularizations of refrigeration systems and applying those principles to assist design engineers. The refrigeration example was chosen here for the sake of clarity; although, it should be clear that the particular subject matter (refrigeration) is not part of the technique.

Figure 2:
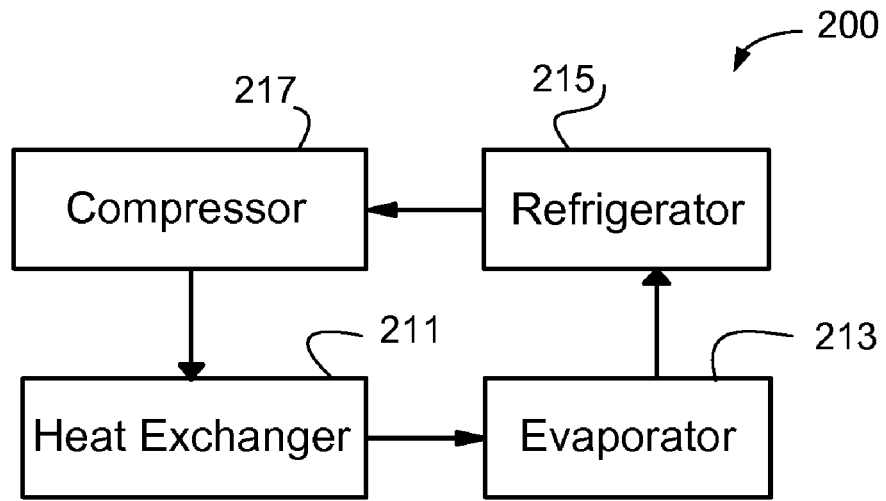
FIG. 2 is a schematic block diagram showing a design of a simple Carnot cycle refrigeration system.

FIG. 2 is a schematic block diagram showing a design of a simple Carnot cycle refrigeration system 200. Depicted are a condenser 211, an evaporator 213, a refrigerator (space to be cooled) 215 and a compressor 217. Basically, fluid is pumped by compressor 217 into condenser 211, past an expansion valve (not shown) to evaporator 213, from which the fluid returns to compressor 217. The heat transfer, from the refrigerator 215 to the evaporator 213, takes place when the fluid changes from gas to liquid, giving off heat in the condenser 211, and after passing the expansion valve changes from liquid to gas in the evaporator 213, thus absorbing heat.

This design has the simple predicate representation:

A

Figure 3:
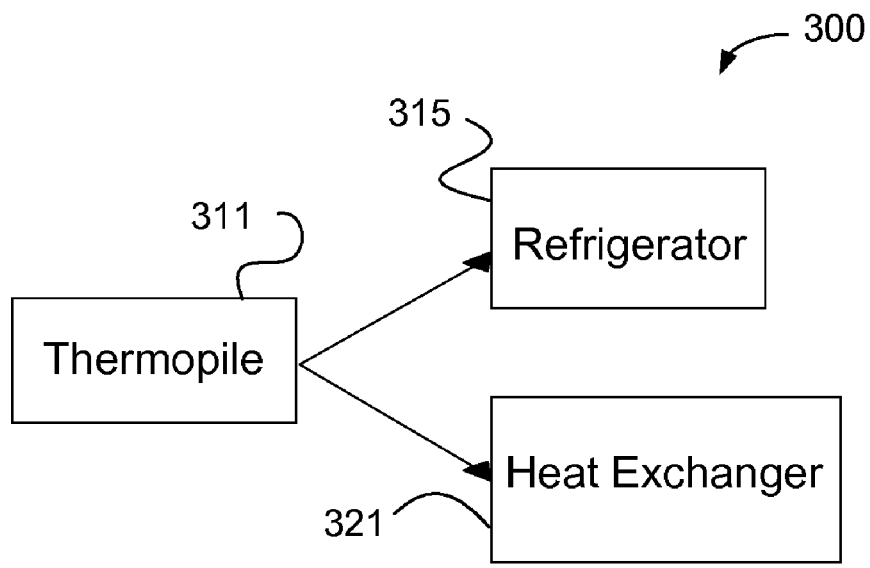
FIG. 3 is a schematic block diagram showing a design of a two-stage Carnot cycle refrigeration system.

Next (condenser, heat exchanger 211);

Next (heat exchanger, evaporator 213);

Next (refrigerator 215);

Next (refrigerator, compressor 217);

FIG. 3 is a schematic block diagram showing a design of a two-stage Carnot cycle refrigeration system 300. Depicted are a thermopile 311, a refrigerator (space to be cooled) 315 and a heat exchanger 321.

This design has the simple predicate representation:

C

Next (thermopile 311, refrigerator 315);

Next (thermopile 311, heat exchanger 321);

Here, the problem is to create a non-deterministic space of possible maps from A to C as a prelude to the automatic design of a multi-stage thermoelectric refrigerator. The idea is to automatically port knowledge from one related design to another. The rules in the version space will be automatically constrained by other cases in system memory, which may not be contradicted. In this manner, the system will automatically get smarter as it acquires more knowledge. At this point, here are two viable maps in the version space, where the second is a generalization of the first:

| A | C |
|---|---|
| Next (condenser, heat exchanger); | next (thermopile 311, refrigerator 315); |
| Next (heat exchanger, evaporator); | next (thermopile 311, heat exchanger 321); |
| Next (refrigerator); | |
| Next (refrigerator, compressor); | |

Hence:

| A | C |
|---|---|
| Compressor | → Thermopile |
| Evaporator | → NIL |
| Next (X, NIL) | → NIL |
| Next (NIL, Y) | → NIL |

Equal (refrigerator, thermopile) (thermopile, refrigerator)

Now, consider applying this generalization to the design of a multi-stage thermoelectric refrigeration system. That is, A→C B':

| A | C | B |
|---|---|---|
| Next (compressor, heat exchanger) | Next (thermopile, heat exchanger) | |
| Next (heat exchanger, evaporator) | | Next (heat exchanger, heat exchanger) |
| Next (evaporator, refrigerator) | → | NIL |

| A | C | B |
|---|---|---|
| Next (refrigerator, compressor) Equal (refrigerator, freezer) | Next (refrigerator, thermopile) | Next (freezer, thermopile) |

Figure 4:
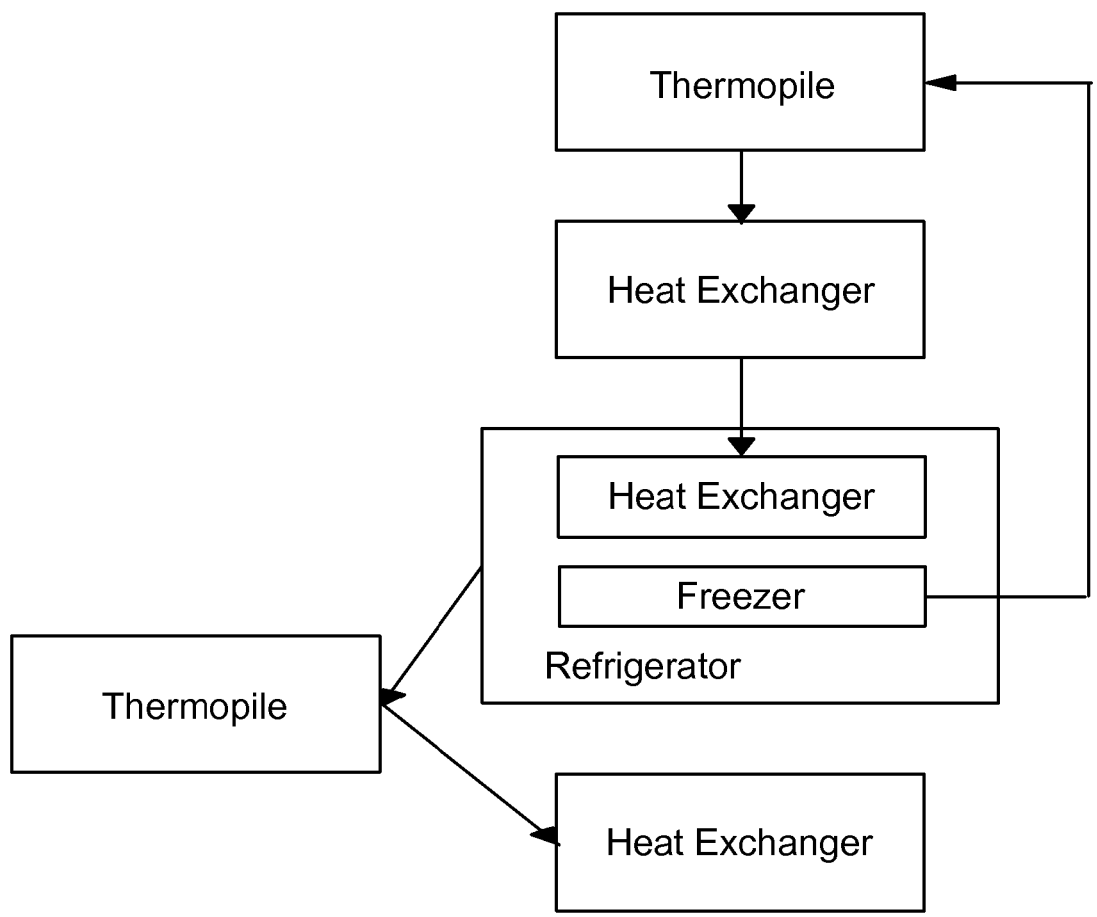
FIG. 4 is a schematic block diagram showing an untransformed result of a two-stage thermoelectric freezer.
Figure 5:
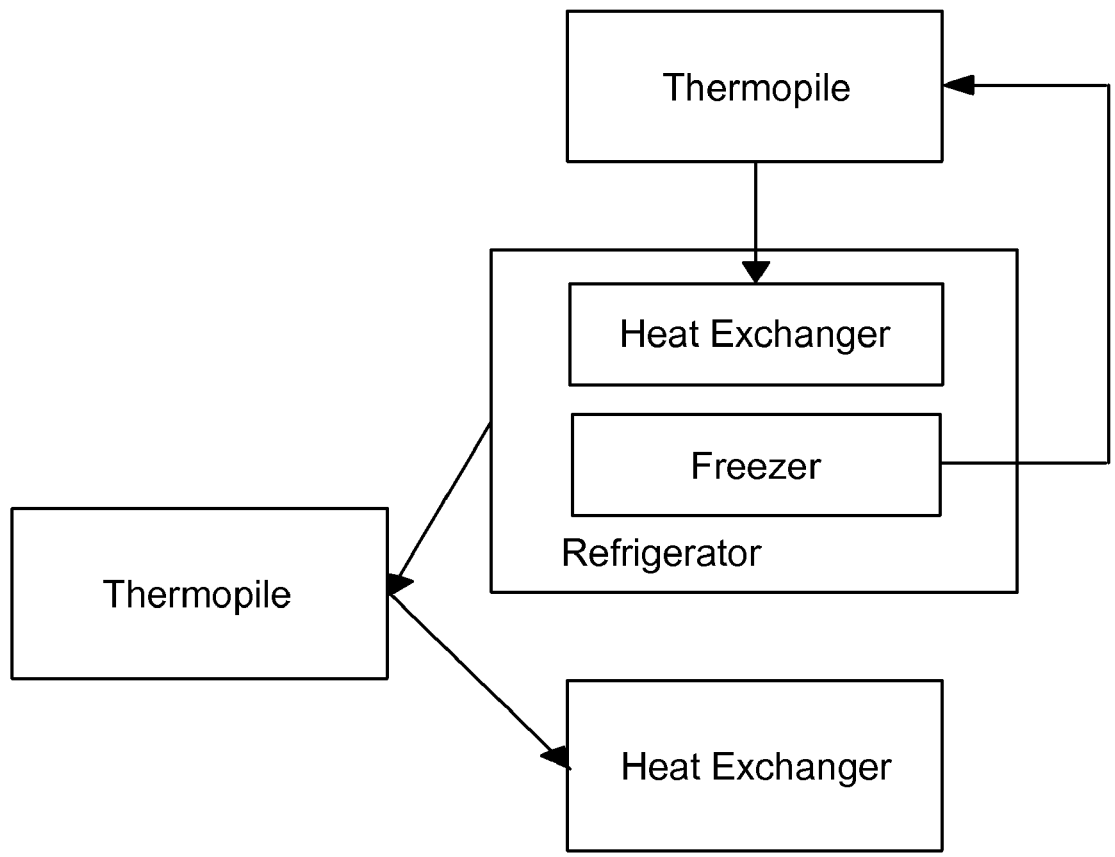
FIG. 5 is a schematic block diagram showing an initial transformation of the two stage thermoelectric freezer of FIG. 4.

The initial equivalent depiction of this two-stage thermoelectric freezer follows. The untransformed result is as depicted in FIG. 4. An initial transformation of the two stage thermoelectric freezer is as depicted in FIG. 5. In FIG. 5 one of the heat exchangers is eliminated and replaced with a thermopile. This provides a first transformation result as a two-stage thermoelectric freezer.

This design is not quite correct though due to a random variation. That is, the translation from fluid mechanics to thermo-electrics is not perfectly symmetric. It is observed that while it makes sense to cool a compressed gas in stages to conserve energy, this is not practical to do using thermocouples. Thus, a the domain-specific (context-sensitive) transformation rule should be added. The domain-specific transformation rule is discovered automatically by the KASER algorithm:

{Next (thermopile, heat exchanger), Next (heat exchanger, heat exchanger)}
→
{Next (thermopile, heat exchanger)};

The corresponding flowchart follows FIG. 4. It is noted that this rule captures this essential difference in thermoelectric systems design for broadly applicable reuse, as well as for further specialization. It is also noted that this rule would not fire for the case of compressors. If the thermoelectric refrigerator were designed first and it was now desired to transform the solution to a gas refrigerator, then we would have the rule:
{Next (thermopile, heat exchanger)}→{Next (compressor, heat exchanger), Next (heat exchanger, evaporator), Next (evaporator, refrigerator)}, where
{Next (heat exchanger, evaporator)}→{Next (heat exchanger, evaporator), Next (heat exchanger, heat exchanger)}.

It is observed that right recursion will not be a problem. Looking closely at FIG. 5, there appears a design flaw; namely, a thermopile and its heat exchanger must be maintained at the same ambient temperature. FIG. 5 evidences that this is not the case for the second-level thermopile. Given that the graphics package here may not embody such domain-specific knowledge, the predicates should be added, namely, Same_Temp (Thermopile, Heat Exchanger), Colder (Refrigerator, Ambient), and possibly Colder (Freezer, Refrigerator). A first or second-order predicate calculus can be employed here to deduce relations. For example, a thermopile may not be found to be at ambient temperature with its heat exchanger in the freezer because it is possible to deduce Colder (freezer, ambient), which violates Same_Temp (thermopile, heat exchanger).

Figure 6:
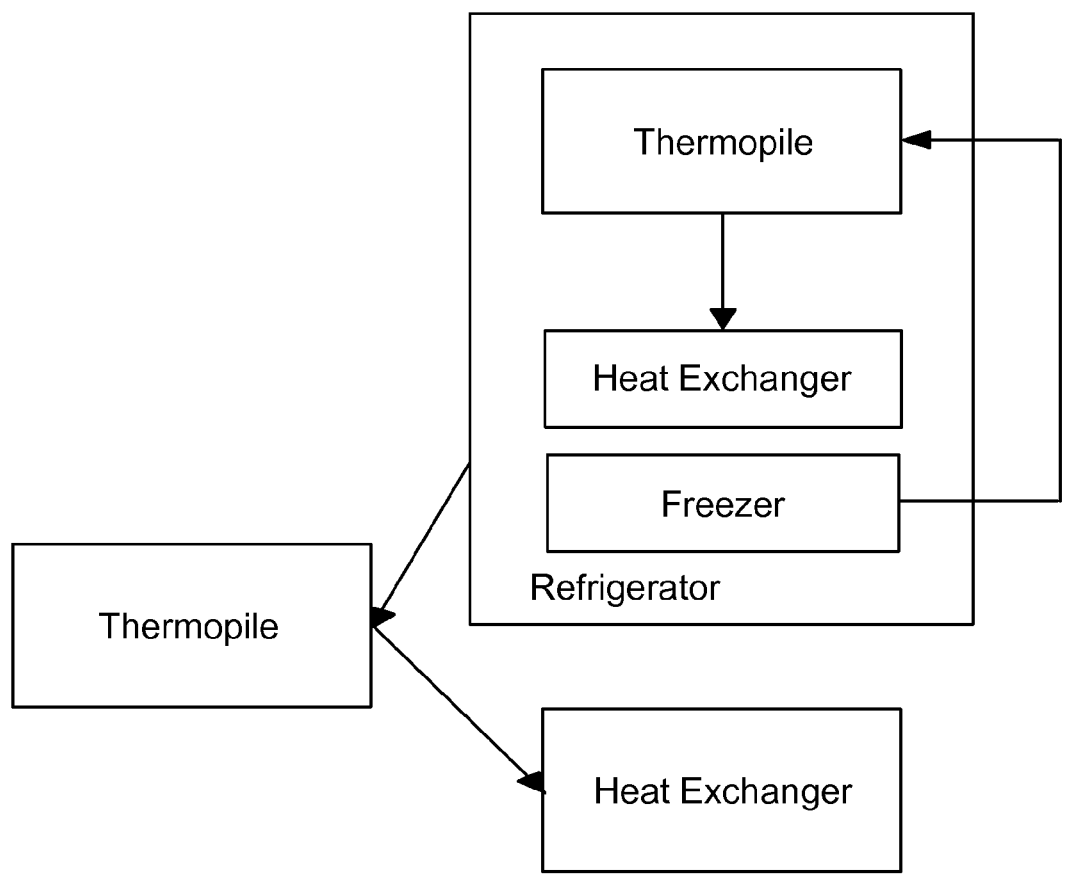
FIG. 6 depicts the second transformation result for a two-stage thermoelectric freezer; in other words, the working two-stage thermoelectric freezer model.

FIG. 6 depicts the second transformation result for a two-stage thermoelectric freezer; in other words, the working two-stage thermoelectric freezer model.

This simple example does not include (or preclude) the use of informative connectives (e.g., a dotted line indicating that the heat exchanger and freezer must not be too close to each other, and the like). Just like the directed arrow translates into the "Next" predicate, the labeled line segment here might be translated into the "Distant" predicate. Furthermore, each non-primitive box is hierarchically defined. Of course, decision boxes and similar constructs (e.g., to capture concurrency as in, Concurrent (Apply Front Brakes, Apply Rear Brakes)) may augment our block diagrams for use in more complex designs. Also, facilities may eventually be needed to support development by simultaneous users. Moreover, the KASER inductive transformative processes have been illustrated in a limited way, for the sake of conceptual clarity, through their application to a first-order predicate calculus formalism. Finally, fuzziness in system design is captured by an allowance for nondeterministic (probabilistic) rewrite rules. For example, the predicate relation, Equal (refrigerator, freezer) can induce non-determinism into the design process.

While this methodology details transformational learning, the rules themselves can effectively program any conceivable learning methodology, since they are universal—including the presentation of questions to elicit additional context. The methodology provides for the fusion of different representations of knowledge. Taken in combination, an effective intelligence is realizable.

It will be understood that many additional changes in the details, materials, steps and arrangement of parts, which have been herein described and illustrated to explain the nature of the subject matter, may be made by those skilled in the art within the principle and scope of the invention as expressed in the appended claims.

What is claimed is:

1. A method for generating new knowledge from stratified knowledge statements (SKSs), the method comprising:
   storing a list of SKSs in at least one memory store on a computer, wherein the list of SKSs is composed of a contiguous listing of cases, generalizations, and analogs, respectively hierarchically ordered in non-increasing validity, wherein cases comprise user-defined knowledge and are relatively valid, and analogs are computer-generated and are the most error prone of the SKSs;
   creating with the computer a new generalization based on one of the SKSs;
   redefining the new generalization into a new case if a user validates the new generalization;
   moving the new validated generalization case to the logical head of the list of cases;
   expunging the new generalization from the list if the new generalization contradicts an existing case;
   creating with the computer a new analog based on three of the SKSs;
   redefining the new analog into a case if a user validates the new analog;
   moving the new validated analog case to the logical head of the case list of SKSs; and
   expunging the new analog from the list if the new analog contradicts an existing case, or generalization.

2. The method of claim 1, wherein each SKS comprises a feature set $\{F_t\}$ at a given time t and a sequence of procedures $(p_{t+i})$ such that $\{F_t\} \rightarrow p_{t+i}$, wherein i is an integer greater than zero, wherein each feature set comprises at least one independent feature, and wherein each sequence of procedures comprises at least one dependent procedure.

3. The method of claim 2, wherein the step of creating a generalization further comprises:

randomly selecting one of the SKSs with at least two features according to a 3-2-1 skew, and removing one of the features from the selected SKS.

4. The method of claim 3, wherein the step of creating an analog further comprises:
   randomly selecting, according to the 3-2-1 skew, a first SKS and a second SKS from the list of SKSs, wherein the first and second SKSs have the same procedural sequence (P) and wherein the feature set ($F_1$) of the first SKS is a subset of the feature set ($F_2$) of the second SKS;
   searching the list of SKSs, starting at the logical head, to find a third SKS with a feature set ($F_3$) and the same procedural sequence (P) as the first and second SKSs; and
   creating a new analog with the same procedural sequence (P) as the first, second, and third SKSs and a feature set ($F_{3+2-1}$) that comprises the features of the second and third SKSs but not the features of the first SKS.

5. The method of claim 4, wherein random selection according to a 3-2-1 skew comprises:
   assigning the logical head of the list of SKSs a probability of being selected of $$\frac{2c}{c(c+1)},$$

where c is the number of SKSs in the list;
   assigning the SKS just below the head SKS a probability of being selected of $$\frac{2(c-1)}{c(c+1)};$$

and
   assigning the tail SKS of the list a probability of being selected of $$\frac{2}{c(c+1)}.$$

6. The method of claim 5, further comprising ascribing a probability to each feature in each SKS.

7. The method of claim 6, further comprising ascribing a probability to each procedure in each SKS.

8. The method of claim 7, further comprising the step of generalizing the probabilities by:
   randomly selecting, according to the 3-2-1 skew, a fourth SKS and a fifth SKS from the list of SKSs, wherein the feature set of the fourth SKS is a subset of the feature set of the fifth SKS;
   replacing the probability value of each feature in the fourth SKS with the lowest probability value between (1) the original probability ascribed to each feature in the fourth SKS and (2) the probability of the corresponding feature in the fifth SKS;
   replacing the probability value of each feature in the fifth SKS with the highest probability value between (1) the original probability ascribed to each feature in the fourth SKS and (2) the probability of the corresponding feature in the fifth SKS;
   replacing the probability value of the procedural sequence in the fourth SKS with the lowest probability value between (1) the original probability ascribed to the procedural sequence in the fourth SKS and (2) the probability of the procedural sequence in the fifth SKS; and
   replacing the probability value of the procedural sequence in the fifth SKS with the highest probability value between (1) the original probability ascribed to the procedural sequence in the fourth SKS and (2) the probability of the procedural sequence in the fifth SKS.

9. The method of claim 8, wherein all features are input using randomized, context-free grammars.

10. A program storage device readable by a machine, tangibly embodying a program of instructions, executable by the machine to perform method steps for reaching conclusions from stratified knowledge statements (SKSs), the method steps comprising:
    storing a list of SKSs in at least one memory store on a computer, wherein the list of SKSs is composed of a contiguous listing of cases, generalizations, and analogs, respectively hierarchically ordered in non-increasing validity, wherein cases comprise user-defined knowledge and are relatively valid, and analogs are computer-generated and are the most error prone of the SKSs, wherein each SKS comprises a feature set $\{F_t\}$ at a given time t and a sequence of procedures ($p_{t+i}$) such that $\{F_t\} \rightarrow p_{t+i}$, wherein i is an integer greater than zero, wherein each feature set comprises at least one independent feature, and wherein each sequence of procedures comprises at least one dependent procedure;
    creating a new generalization by randomly selecting one of the SKSs with at least two features according to a 3-2-1 skew, and removing one of the features from the selected SKS;
    redefining a user-validated generalization into a case;
    moving the validated generalization to the logical head of the list of cases;
    expunging the new generalization from the list if the new generalization contradicts an existing case;
    creating a new analog by randomly selecting, according to the 3-2-1 skew, a first SKS and a second SKS from the list of SKSs, wherein the first and second SKSs have the same procedural sequence (P) and wherein the feature set of the first SKS ($F_1$) is a subset of the feature set of the second SKS ($F_2$), searching the list of SKSs, starting at the logical head, to find a third SKS with a feature set ($F_3$) and the same procedural sequence (P) as the first and second SKSs, giving the new analog the same procedural sequence (P) as the first, second, and third SKSs and a feature set ($F_{3+2-1}$) that comprises the features of the second and third SKSs but not the features of the first SKS;
    redefining user-validated analogs into cases;
    moving validated analogs to the logical head of the list of cases; and
    expunging the new analog from the list if the new analog contradicts an existing case or generalization.

11. The machine-readable program storage device of claim 10, wherein the step of random selection according to a 3-2-1 skew comprises:
    assigning the logical head of the list of SKSs a probability of being selected of $$\frac{2c}{c(c+1)},$$

where c is the number of SKSs in the list;

assigning the SKS just below the head SKS a probability of being selected of $$\frac{2(c-1)}{c(c+1)};$$

and assigning the tail SKS of the list a probability of being selected of $$\frac{2}{c(c+1)}.$$

12. The machine-readable program storage device of claim 11, wherein the method steps for reaching conclusions from SKSs further comprises ascribing a probability to each feature in each SKS.

13. The machine-readable program storage device of claim 12, wherein the method steps for reaching conclusions from SKSs further comprises ascribing a probability to each procedure in each SKS.

14. The machine-readable program storage device of claim 13, wherein the method steps for reaching conclusions from SKSs further comprises the step of generalizing the probabilities by:
    randomly selecting, according to the 3-2-1 skew, a fourth SKS and a fifth SKS from the list of SKSs, wherein the feature set of the fourth SKS is a subset of the feature set of the fifth SKS;
    replacing the probability value of each feature in the fourth SKS with the lowest probability value between (1) the original probability ascribed to each feature in the fourth SKS and (2) the probability of the corresponding feature in the fifth SKS;
    replacing the probability value of each feature in the fifth SKS with the highest probability value between (1) the original probability ascribed to each feature in the fourth SKS and (2) the probability of the corresponding feature in the fifth SKS;
    replacing the probability value of the procedural sequence in the fourth SKS with the lowest probability value between (1) the original probability ascribed to the procedural sequence in the fourth SKS and (2) the probability of the procedural sequence in the fifth SKS; and
    replacing the probability value of the procedural sequence in the fifth SKS with the highest probability value between (1) the original probability ascribed to the procedural sequence in the fourth SKS and (2) the probability of the procedural sequence in the fifth SKS.

15. The machine-readable program storage device of claim 14, wherein all features are input using randomized, context-free grammars.

16. A system of computers for reaching conclusions from stratified knowledge statements (SKSs), the system comprising:
    a central computer;
    a plurality of distributed processors communicatively coupled to the central computer; and
    wherein the central computer is configured to coordinate the activities of the distributed processors, and wherein each of the distributed processors is a domain-specific subsystem, configured to maintain a local list of SKSs composed of a contiguous listing of cases, generalizations, and analogs, respectively hierarchically ordered in non-increasing validity, wherein cases comprise user-defined knowledge and are relatively valid, and analogs are computer-generated and are the most error prone of the SKSs; and wherein each distributed processor is configured to increase its corresponding local list of SKSs by generating new generalizations and analogs.

17. The system of claim 16, wherein each distributed processor is configured to structure each SKS such that each case, generalization, and analog comprises a feature set $\{F_t\}$ at a given time t and a sequence of procedures ($p_{t+i}$) such that $\{F_t\} \rightarrow p_{t+i}$, wherein i is an integer greater than zero, wherein each feature set comprises at least one independent feature, and wherein each sequence of procedures comprises at least one dependent procedure.

18. The system of claim 17, wherein each distributed processor is configured to generate new generalizations by randomly selecting one of the SKSs with at least two features according to a 3-2-1 skew, and removing one of the features from the selected SKS.

19. The system of claim 18, wherein each distributed processor is configured to generate new analogs by:
    randomly selecting, according to the 3-2-1 skew, a first SKS and a second SKS from the list of SKSs, wherein the first and second SKSs have the same procedural sequence and wherein the feature set of the first SKS ($F_1$) is a subset of the feature set of the second SKS ($F_2$);
    searching the list of SKSs, starting at the logical head, to find a third SKS with a feature set ($F_3$) and the same procedural sequence as the first and second SKSs; and
    creating a new analog with the same procedural sequence as the first, second, and third SKSs and a feature set ($F_{3+2-1}$) that comprises the features of the second and third SKSs but not the features of the first SKS.

20. The system of claim 19, wherein each distributed processor is configured to randomly select SKSs according to a 3-2-1 skew by:
    assigning the logical head of the list of SKSs a probability of being selected of $$\frac{2c}{c(c+1)},$$

where c is the number of SKSs in the list;
    assigning the SKS just below the head SKS a probability of being selected of $$\frac{2(c-1)}{c(c+1)};$$

and
    assigning the tail SKS of the list a probability of being selected of $$\frac{2}{c(c+1)}.$$

* * * * *